(12) United States Patent
Harman et al.

(10) Patent No.: US 7,035,451 B2
(45) Date of Patent: Apr. 25, 2006

(54) IMAGE CONVERSION AND ENCODING TECHNIQUES

(75) Inventors: Philip Victor Harman, Scarborough (AU); Simon Richard Fox, Heathmont (AU); Mark Robert Dowley, South Perth (AU); Julien Charles Flack, Swanbourne (AU)

(73) Assignee: Dynamic Digital Depth Research Pty Ltd., Bentley (AU)

( * ) Notice: Subject to any disclaimer, the term of this patent is extended or adjusted under 35 U.S.C. 154(b) by 688 days.

(21) Appl. No.: 09/925,932

(22) Filed: Aug. 9, 2001

(65) Prior Publication Data
US 2002/0048395 A1 Apr. 25, 2002

(30) Foreign Application Priority Data
Aug. 9, 2000 (AU) ..................................... PQ9292
Sep. 29, 2000 (AU) ..................................... PR0455

(51) Int. Cl.
*G06K 9/00* (2006.01)
(52) U.S. Cl. ..................................... 382/154
(58) Field of Classification Search ................ 382/100, 382/154; 345/418, 419, 422, 427, 582; 356/12; 352/57
See application file for complete search history.

(56) References Cited

U.S. PATENT DOCUMENTS

| | | | | | |
|---|---|---|---|---|---|
| 4,925,294 | A | * | 5/1990 | Geshwind et al. | 352/57 |
| 5,469,535 | A | * | 11/1995 | Jarvis et al. | 345/582 |
| 5,767,857 | A | * | 6/1998 | Neely | 345/427 |
| 6,055,330 | A | * | 4/2000 | Eleftheriadis et al. | 382/154 |

FOREIGN PATENT DOCUMENTS

| | | |
|---|---|---|
| EP | 0676724 A2 | 10/1995 |
| WO | WO 95/27266 A1 | 10/1995 |
| WO | WO 99/30280 A1 | 6/1999 |

\* cited by examiner

*Primary Examiner*—Vikkram Bali
(74) *Attorney, Agent, or Firm*—Banner & Witcoff, Ltd.

(57) ABSTRACT

A method of creating a depth map including the steps of assigning a depth to at least one pixel or portion of an image, determining relative location and image characteristics for each at least one pixel or portion of the image, utilizing the depth(s), image characteristics and respective location to determine an algorithm to ascertain depth characteristics as a function relative location and image characteristics, utilizing said algorithm to calculate a depth characteristic for each pixel or portion of the image, wherein the depth characteristics form a depth map for the image. In a second phase of processing the said depth maps form key frames for the generation of depth maps for non-key frames using relative location, image characteristics and distance to key frame(s).

39 Claims, 5 Drawing Sheets

IMAGE CONVERSION AND ENCODING TECHNIQUES

CROSS-REFERENCE TO RELATED APPLICATIONS

This application is based upon and claims the benefit of priority from the prior Australian Patent Application Nos. PQ9292, filed Aug. 9, 2000, and PR0455, filed Sept. 29, 2000, the entire contents of which are incorporated herein by reference.

FIELD OF THE INVENTION

The present invention is an improved technique for deriving depth maps from one or more 2D images.

BACKGROUND OF THE INVENTION

A number of image processing tasks require that the depth of objects within an image be known. Such tasks include the application of special effects to film and video sequences and the conversion of 2D images into stereoscopic 3D. Determining the depth of objects may be referred to as the process of creating a depth map. In a depth map each object is coloured a shade of grey such that the shade indicates the depth of the object from a fixed point. Typically an object that is distant will be coloured in a dark shade of grey whilst a close object will be lighter. A standard convention for the creation of depth maps is yet to be adopted, and the reverse colouring may be used or different colours may be used to indicate different depths. For the purposes of explanation in this disclosure distant objects will be coloured darker than closer objects, and the colouring will typically be grey scale.

Historically the creation of a depth map from an existing 2D image has been undertaken manually. It will be appreciated that an image is merely a series of pixels to a computer, whereas a human operator is capable of distinguishing objects and their relative depths.

The creation of depth maps involves a system whereby each object of the image to be converted is outlined manually and a depth assigned to the object. This process is understandably slow, time consuming and costly. The outlining step is usually undertaken using a software program in conjunction with a mouse. Examples of a software program that may be used to undertake this task is Adobe "After Effects". An operator using After Effects would typically draw around the outline of each object that requires a depth to be assigned and then fill or "colour in" the object with the desired shades of grey that defines the depth or distance from the viewer required. This process would then be repeated for each object in the image. Further, where a number of images are involved, for example a film, it will also be necessary to carry out these steps for each image or frame of the film.

In the traditional system the outline of the image would typically be described as some form of curve, for example a Bezier curve. The use of such a curve enables the operator to alter the shape of the outline such that the outline of the object can be accurately aligned with the object.

Should a series of images require depth mapping e.g., a film or video, then the process would be repeated for each frame in the sequence.

It is likely that the size, position and/or depth of an object may change through a sequence. In this case the operator is required to manually track the object in each frame and processing each frame by correcting the curve, and updating the object depth by changing the shade of grey as necessary. It will be appreciated that this is a slow, tedious, time consuming and expensive process.

Previous attempts have been made to improve this process. The prior art describes techniques that attempt to automatically track the outline of the object as it moves from frame to frame, An example of such a technique is the application of Active Contours (ref: Active Contours—Andrew Blake and Michael Isard—ISBN 3-540-76217-5). The main limitation of this approach is the need to teach the software implementing the technique the expected motion of the object being tracked. This is a significant limitation when either the expected motion is not known, complex deformations are anticipated, or numerous objects with different motion characteristics are required to be tracked simultaneously.

Point-based tracking approaches have also been used to define the motion of outlines. These are popular in editing environments such as Commotion and After Effects. However, their application is very limited because it is frequently impossible to identify a suitable tracking point whose motion reflects the motion of the object as a whole. Point tracking is sometimes acceptable when objects are undergoing simple translations, but will not handle shape deformations, occlusions, or a variety of other common problems.

An Israeli company, AutoMedia, has produced a software product called AutoMasker. This enables an operator to draw the outline of an object and track it from frame to frame. The product relies on tracking the colour of an object and thus fails when similar coloured objects intersect. The product also has difficulty tracking objects that change in size over subsequent frames, for example, as an object approaches a viewer or moves forward on the screen.

None of these approaches are able to acceptably assign, nor track, depth maps, and thus the creating of the depth maps is still a manual system.

Other techniques are described in the prior art and rely on reconstructing the movement of the camera originally used to record the 2D sequence. The limitation of these techniques is the need for camera motion within the original image sequence and the presence of well-defined features within each frame that can be used as tracking points.

OBJECT OF THE INVENTION

Presently, it is necessary for an operator to manually create a depth map for each frame of an image, so as to obtain acceptable results. It is an object of the present invention to reduce the number of frames that require manual depth creation, thereby reducing the time commitments for operators creating the depth maps.

There remains a set of frames for which the depth maps are still to be created manually, It is a further object of the invention to assist the manual process of depth map creation for these frames.

SUMMARY OF THE INVENTION

With the above objects in mind the present invention provides a method of creating a depth map including the steps of:

assigning a depth to at least one pixel or portion of an image;

determining relative location and image characteristics for each said at least one pixel or portion of said image;

utilising said depth(s), image characteristics and respective relative location to determine a configuration of a first algorithm to ascertain depth characteristics as a function of relative location and image characteristics;

utilising said first algorithm to calculate a depth characteristic for each pixel or portion of said image;

wherein said depth characteristics form a depth map for said image.

In another aspect the present invention provides a method of creating a depth map including the steps of:

assigning a depth to at least one pixel or portion of an image;

determining x,y coordinates and image characteristics for each said at least one pixel or portion of said image;

utilising said depth(s), image characteristics and respective x,y coordinates to determine a first algorithm to ascertain depth characteristics as a function of x,y coordinates and image characteristics;

utilising said first algorithm to calculate a depth characteristic for each pixel or portion of said image;

wherein said depth characteristics form a depth map for said image.

In a further aspect the present invention provides a method of creating a series of depth maps for an image sequence including the steps of:

receiving a depth map for at least one frame of said image sequence;

utilising said depth map to determine a configuration of an algorithm to ascertain the depth characteristics as a function of relative position and image characteristics;

utilising said algorithm to create a depth map for each frame of said image sequence.

In yet a further aspect the present invention provides a method of creating a series of depth maps for an image sequence including the steps of:

selecting at least one key frame from said image sequence;

for each at least one key frame assigning a depth to at least one pixel or portion of each frame;

determining relative position (for example x, y coordinates) and image characteristics for each said at least one pixel or portion of each said frame;

utilising said depth(s), image characteristics and relative position for each said at least one frame to determine a configuration of an algorithm for each said at least one frame to ascertain depth characteristics as a function of relative position and depth characteristics;

utilising each configuration of said algorithm to calculate depth characteristics for each pixel or portion of each said at least one frame;

wherein said depth characteristics form a depth map for each said at least one frame.

utilising each depth map to determine a second configuration of a second algorithm to ascertain the depth characteristics for each frame as a function of relative position and image characteristics;

utilising said second algorithm to create respective depth maps for each frame of said image sequence.

It will be understood that the system in referring to an algorithm may in fact create a number of different functions in order to create the depth maps as a result of the relative position and image characteristics. In the preferred system the relative position will be a measure of the x,y coordinates.

A system implementing the present invention may elect to predetermine which frames in a sequence are to be considered key frames, for example each fifth frame. The algorithm will also ideally consider time as an input to the algorithm to further refine the processing.

BRIEF DESCRIPTION OF THE INVENTION

The invention is intended to improve the process of producing depth maps for associated 2D images, This preferred embodiment involves two phases of generating key-frame depth maps, and generating the remaining maps.

The first phase obtains a small amount of data from the user. This data is indicative of the basic structure of the scene. The 2D image and this associated data are presented to an algorithm that is capable of learning the relationship between the depth z assigned by the user to various image pixels, its x and y location, and image characteristics. The image characteristics include, although are not limited to, the RGB value for each pixel. In general the algorithm solves the equation $$z=f(x,y,R,G,B)$$

for each pixel in the frame that the user has defined.

The algorithm then applies this learned relationship to the remaining pixels in the image to generate a depth map. If necessary, the user can refine their data to improve the accuracy of the depth map. It should be noted that the initial depth data need not necessarily be specified by a user—it may be determined by some other process including, but not limited to using an automated structure from motion algorithm or deriving depth estimates from stereo images.

The second phase requires 2D images and associated depth maps to be provided at selected key-frames. The depth maps at these key-frames may be generated for example as previously disclosed by the applicants, or produced automatically using depth capture techniques including, although not limited to, laser range finders i.e. LIDAR (Light Direction And Range) devices and depth-from-focus techniques.

The 2D image and associated depth map(s), for each key-frame, is presented to an algorithm that is capable of learning the relationship between the depth z assigned to each pixel in the remaining frames, its x and y location and image characteristics. The image characteristics include, although are not limited to, the RGB value of each pixel. In general the algorithm solves the equation $$z=f(x,y,R,G,B)$$

for each pixel in the key-frames.

The algorithm is then presented with each subsequent frame between the adjacent key-frames and for each pixel uses the algorithm to calculate the value of z.

DETAILED DESCRIPTION OF THE INVENTION

The invention provides an improved technique for deriving depth maps from one or more 2D images. The invention preferably includes two phases, each of which ideally incorporates an automated learning process.

Phase One

The first phase operates on a single image. A user is presented with the image and defines approximate depths for various regions in the image using a simple graphical interface. The graphical interface may provide tools to assist the user in assigning depths to pixels, including but not limited to pen and paintbrush tools, area fill tools and tools that assign a depth based on the pixel colour. The result of this process is that the depth is defined for a subset of the pixels in the image.

Figure 1:
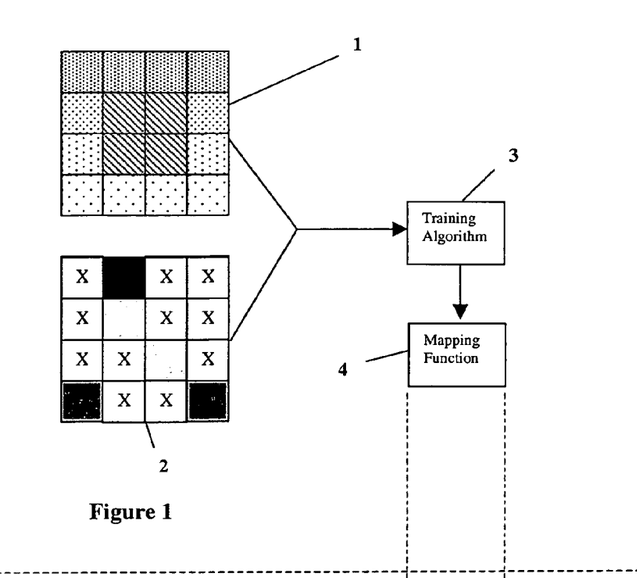
FIG. 1 shows one embodiment of the training process of Phase One.

This is exemplified in FIG. 1, where a 2D image 1 may be presented to the user. The user can then assign depth to various pixels within the image 2. In the example of FIG. 1 the pixels marked "X" are pixels for which a depth has not been specified by the user. The system then correlates the 2D image 1 with the depth data 2 provided by the user, and utilises a training algorithm 3 to assist in the creation of a mapping function 4, which is capable of solving a function for the depth of each pixel in the image.

The information provided by the user defines the training data that is used with the learning process, described hereafter, to associate a depth with each pixel in the said single image. This process may be interactive, in that the user may define approximate depths for only a few regions. Based on the results of the learning process for the said regions the user may provide further depth estimates for regions where the learning process performed poorly. This interaction between the user and the learning process may be repeated a number of times. In effect the user may guide the learning process at this stage. It should be noted that the initial depth data need not be necessarily be specified by a user—it may be determined by some other process as described above.

Create Mapping Function

Once the system is provided with the image and some pixel depths, the system then and analyses the pixels with defined depths in order to create a mapping function. The mapping function may be a process or function that takes as input any measurement of a pixel or a set of pixels from the image and provides as output a depth value for the pixel or set of pixels.

Individual pixel measurements may consist of red, green and blue values, or other measurements such as luminance, chrominance, contrast and spatial measurements such as horizontal and vertical positioning in the image. Alternatively the mapping function may operate on higher level image features, such as larger sets of pixels and measurements on a set of pixels such as mean and variance or edges, corners etc (i.e. the response of a feature detector). Larger sets of pixels may for example represent segments in the image, being sets of connected pixels forming a homogenous region.

For illustrative purposes only, a pixel may be represented in the form x,y,R,G,B,z where x and y represent the relative position as the x and y coordinates of the pixel, R,G,B represent the red, green and blue values of that pixel, and z represents the depth of that pixel. Values of z are only defined where the user has specified a value.

The mapping function is learnt by capturing the relationship between image data and depth data for the pixels identified by the user. The mapping function may take the form of any generic-processing unit, where input data is received, processed, and an output given. Preferably, this processing unit is amenable to a learning process, where its nature is determined by examination of the user data and corresponding image data.

The process of learning this relationship between input data, and desired output would be understood by those who have worked in the areas of artificial intelligence or machine learning, and may take on many forms. It is noted that these persons would not normally work in the areas of stereoscopic systems, or conversion of 2D images to 3D. In machine learning, such mapping functions are known and include, although are not limited to, neural networks, decision trees, decision graphs, model trees and nearest-neighbour classifiers. Preferred embodiments of a learning algorithm are those that seek to design a mapping function that minimises some measurement of mapping error and that generalise satisfactorily for values outside the original data set.

The learning algorithm may either attempt to determine the relationship between the 2D image information and the depth globally over the whole image or locally over smaller spatial areas.

This relationship may then be applied to complete the depth maps for the entire sequence.

Figure 2:
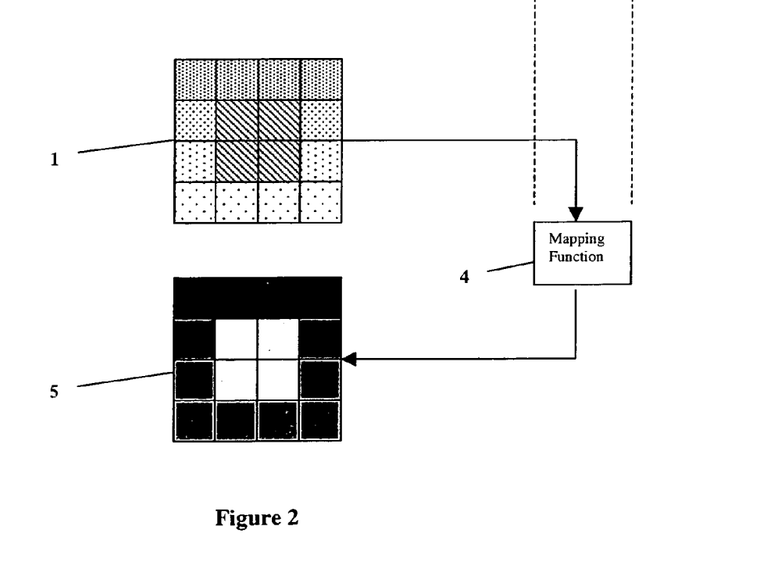
FIG. 2 shows one embodiment of the conversion process of Phase One.

This can be exemplified by FIG. 2, which inputs data from the 2D image 1, into the created mapping function 4, to create a depth map 5 of the 2D image 1.

Examples of successful learning algorithms are the back-propagation algorithm for learning neural networks, the C4.5 algorithm for learning decision trees, locally weighted linear regression and the K-Means algorithm for learning cluster-type classifiers.

For illustrative purposes only, the learning algorithm may be considered to compute the following relationship for each pixel in the frame of the 2D-image sequence $$z_n = k_a \cdot x_n + k_b \cdot y_n + k_c \cdot R_n + k_d \cdot G_n + k_e \cdot B_n$$

where n is the nth pixel in the key-frame image $z_n$ is the value of the depth assigned to the pixel at $x_n, y_n$ $k_a$ to $k_e$ are constants and are determined by the algorithm $R_n$ is the value of the Red component of the pixel at $x_n, y_n$ $G_n$ is the value of the Green component of the pixel at $x_n, y_n$ $B_n$ is the value of the Blue component of the pixel at $x_n, y_n$ This process is illustrated in FIG. 1.

It will be appreciated by those skilled in the art that the above equation is a simplification for purposes of explanation only and would not work ideally in practice. In a practical implementation using, for example, a neural network and given the large number of pixels in an image, the network would learn one large equation containing many k values, multiplications and additions. Furthermore, the K-values may vary across different x,y positions in the image, adapting to local image features.

Apply Mapping Function to 2D Image

The invention next takes this mapping function and applies it to the entire frame of the 2D-image sequence. For a given pixel the inputs to the mapping function are determined in a similar manner as that presented to the mapping function during the learning process. For example, if the mapping function was learnt by presenting the measurements of a single pixel as input, the mapping function will now require these same measurements as input. With these inputs, the mapping function performs its learnt task and outputs a depth measurement. Again, in the example for a single pixel, this depth measurement may be a simple depth value. In this example, the mapping function is applied across the entire image, to complete a full set of depth data for the image. Alternatively, if the mapping function was trained using larger sets of pixels, it is now required to generate such larger sets of pixels for the image. The higher-level measurements on these sets of pixels are made, such as mean and variance, in the same manner as that during the learning process. With these inputs now established, the mapping function produces the required depth measurement, for that set of pixels.

This process is illustrated in FIG. 2, and results in a full depth map for the 2D image. If the resulting depth map contains regions of error, modifications may be made to the user data and the process repeated to correct these regions. The mapping function may also be applied to other frames to generate depth maps.

It will be appreciated by those skilled in the art of Machine Learning that the training stage may be implied by a generic configuration of the algorithm. This approach is referred to as instance based learning, and includes, but is not limited to techniques such as locally weighted linear regression. In an alternative embodiment, the user may define a set of objects and assign pixels to the objects. In this embodiment, the process of generalising the user data to the remaining pixels of the image segments the entire image into the set of objects initially identified by the user. The mapping function defining the objects or the objects themselves may be the required output of this embodiment. Alternatively, functions may be applied to the objects to specify the depth of these objects, thereby constructing a depth map for the image. These functions may take the form of depth ramps and other ways of defining the depth of objects as defined in the Applicants prior application PCT/AU00/00700.

In a further alternative embodiment, the training algorithm may attempt to introduce a random component into the user information. With any learning algorithm this helps to overcome the difficulty of over-training. Over-training refers to the situation where the learning algorithm simply remembers the training information. This is analogous to a child wrote-learning multiplication tables without gaining any understanding of the concept of multiplication itself. This problem is known in the field of machine learning, and an approach to relieving the problem is to introduce random noise into the training data. A good learning algorithm will be forced to distinguish between the noise in the training data, and the quality information. In doing this, it will be encouraged to learn the nature of the data rather than simply remember it. An example embodiment of this approach refers to the previous example, where the training algorithm learns the function:

$$z_n = k_a \cdot x_n + k_b \cdot y_n + k_c \cdot R_n + k_d \cdot G_n + k_e \cdot B_n$$

When presenting the inputs to the training algorithm, being z,x,y,R,G and B, a small noise component is added to these values. The noise component may be a small positive or negative random number. In the preferred embodiment no noise is added to the z component.

Learning Process

In the preferred embodiment the inputs to the learning process are:
1. A number of training samples that are attributed with certain characteristics including depth.
2. A number of "classification" samples that are attributed with characteristics matching the training samples and whose depth is to be determined by the learning process.

The training samples consist of individual pixels whose characteristics include the position (x,y), colour (R,G,B) and depth (z) of the pixels. The aim of the learning process is to calculate a depth (z) for each of the classification pixels whose characteristics include position (x,y) and colour (R,G,B).

For each classification sample, the first stage of the learning algorithm involves identifying a subset of the training samples that share "similar" image characteristics to the classification pixels in question.

Searching for Training Candidates

To identify training samples with similar characteristics to the current classification sample, we consider an n-dimensional feature space in which samples occur. In the preferred embodiment this is a 5 dimensional space with each dimension representing one of the image characteristics: x,y,R,G,B. The axis of this space are normalised to account for differences in the range of each dimension. We may therefore refer to the differences between samples using relative percentages, For example, the R component of a given sample may differ by 10% (of the absolute range of the R component) relative to a second sample.

The distance between two samples in this space is a measure of their similarity. To detect training samples that are similar to the current classification sample a search radius is defined. Any training sample whose distance from the classification sample is smaller than the search radius is considered to be similar to the classification sample and is used in the calculation of depth. Distance in the n-dimensional search space is measured using a simple Euclidean metric. In data that does not occupy a significant portion of the n-dimensional feature space Mahalanobis distance metrics are used to provide better results. Alternative means of stretching the range of the data such as histogram equalization or principal component analysis of the RGB, YUV or HSV components provide similar benefits.

The search radius is a critical parameter in accurate estimation of depth and is configured relative to the characteristics of the data. In data exhibiting high spatial or temporal autocorrelation the radius is set to smaller values than for images with low spatial or temporal autocorrelation.

The search radius may be different for each dimension of the feature space. For example, the search radius in the x-axis may be different from the search radius in the axis representing the red colour intensity. Furthermore, the learning process can adapt these parameters to the data within certain user-defined bounds. For example, if no suitable training samples are identified within a spatial radius of 5% and a colour radius of 10% then the spatial radius is increased to 10%.

Figure 8:
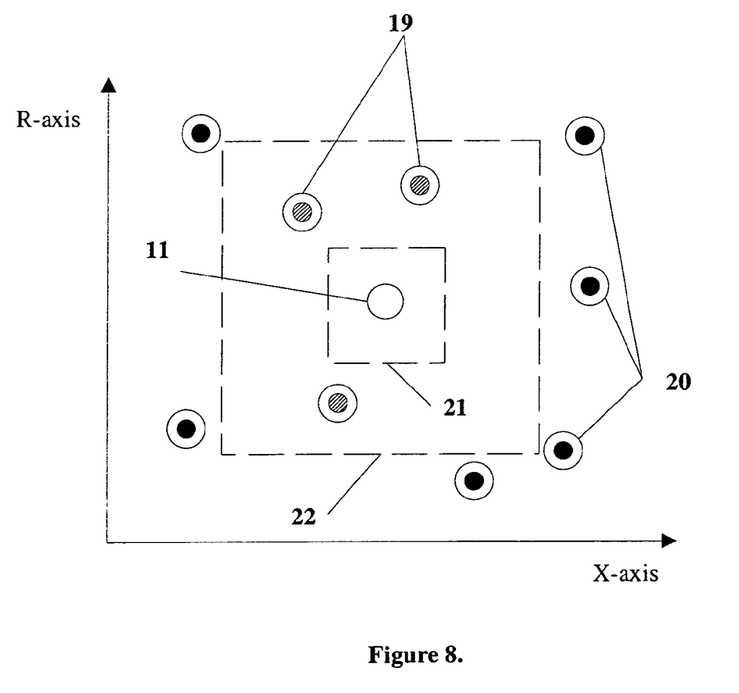
FIG. 8 illustrates the process of searching for candidate training samples.

FIG. 8 illustrates a simplified example of the candidate searching process. The figure depicts a 2 dimensional search space with variations in the spatial x-coordinate of samples plotted against variations in the red colour intensity for the purposes of illustration. Within this space are a number of training samples 20. Within a distance of a first radius 21 of the target pixel 11 there are no training samples. The learning process therefore expands its search to a second search radius 22 of the target pixel 11 and identifies 3 candidate training samples.

Alternative search strategies may be used to identify suitable training candidates. In such strategies training data is stored in structures such as a has tree, k-d Tree or an n-dimensional Voronoi diagram. Although such strategies may increase the speed with which candidate training samples are identified, they do not affect the nature of the invention.

Similarly, search strategies that exploit the proximity of subsequent classification samples in the feature space by caching training samples may improve the speed with which candidate training samples are identified but do not significantly add to the invention.

Distance Weighted Learning

To calculate a depth for any given classification sample we require one or more training samples which are deemed to be similar to the classification sample as described above. We refer to these training samples as the "candidate" training samples.

We calculate the depth of the classification sample as a weighted average of the candidate training samples depth. The weight attributed to any candidate training sample is relative to its distance from the classification sample in the n-dimensional space. As described above this distance is normalised and may be data-biased using Mahalanobis metrics or principal component style analysis.

Figure 9:
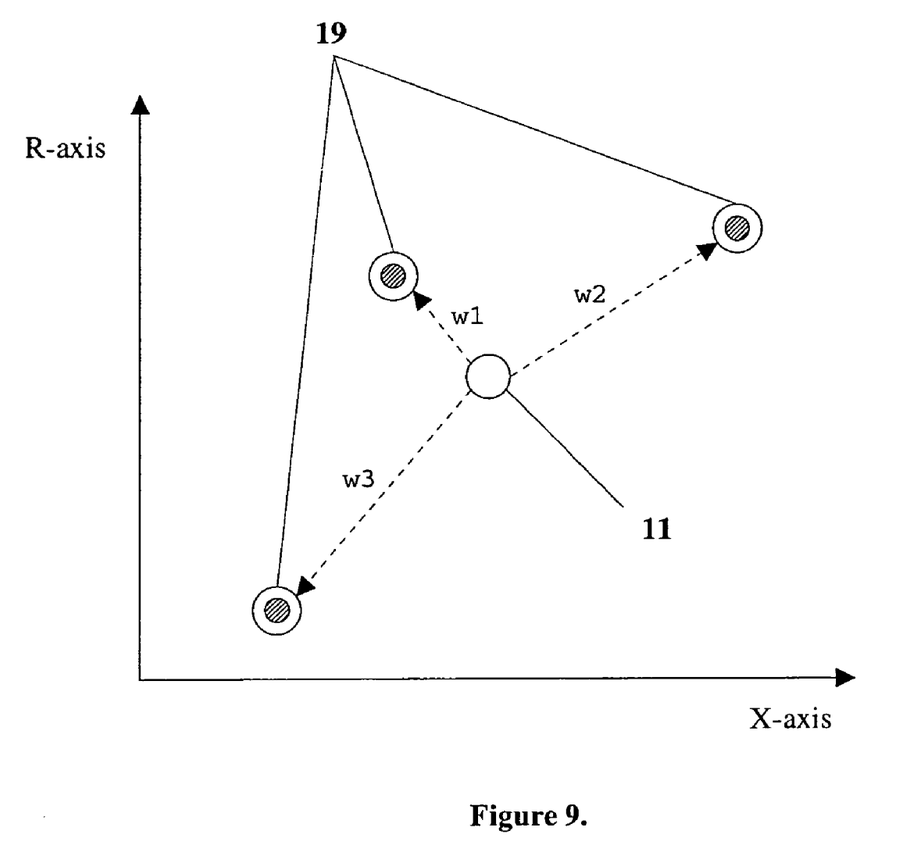
FIG. 9 illustrates the calculation of depth from a number of candidate training samples.

FIG. 9 illustrates a simplified example of the depth calculation process. As in FIG. 8, FIG. 9 depicts a 2 dimensional search space with variations in the spatial x-coordinate of samples plotted against variations in the red colour intensity for the purpose of illustration. Three candidate training samples 19 are shown at different distances (labeled w1,w2,w3) from the target pixel 11. The depth may be calculated as a weighted average of the candidate training samples using:

$$\text{Target Pixel Depth} = \frac{(w1*D1 + w2*D2 + w3*D3)}{(w1 + w2 + w3)}$$

Where D1 is the depth of the training sample at a distance of w1 from the target pixel 11, D2 is the depth of the training sample at a distance w2 from the target pixel and D3 is the depth of the training sample at a distance w3 from the target pixel 11.

In the preferred embodiment the weights are inversely proportional to the square of distance in n-dimensional space.

Alternative Embodiment

In an alternative embodiment the learning process analyses the complete set of available training data and infers rules governing the relationship of the image characteristics to the depth of a sample.

Figure 5:
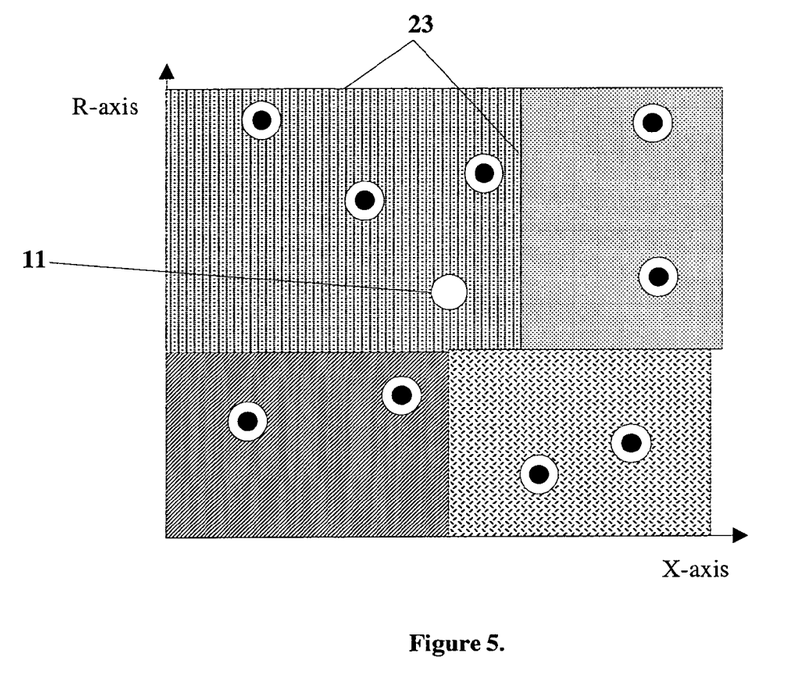
FIG. 5 illustrates how the learning process may partition the feature space.

In this process the n-dimensional feature space is divided or partitioned into a set of regions. FIG. 5 illustrates a simplified representation of this principle. In this example, the n-dimensional space is divided by decision boundaries 23 into a number of rectangular regions. A depth value is assigned to the target pixel 11 based on which region it occupies.

In practice, the M5 model tree algorithm is used to perform the partition of the feature space. The M5 algorithm improves on the basic example described above in two ways. Decision boundaries do not have to be perpendicular to the feature space axes and depths may vary within individual regions as a linear function of the image characteristics.

Those skilled in the art of Machine Learning will appreciate that many learning schemes may be used in place of the M5 model tree algorithm, including neural networks, decision trees decision graphs and nearest-neighbour classifiers. The exact nature of the learning algorithm does not affect the novelty of the invention.

In the preferred embodiment the learning process operates on the image characteristics x,y,R,G,B. Alternative embodiments may operate on higher level image characteristics such as larger sets of pixels and measurements on a set of pixels such as the mean and variance or edges, corners etc (i.e. the response of a feature detector). Larger sets of pixels may for example represent segments in the image, being sets of connected pixels forming a homogenous region.

Phase Two

The second phase operates on an image sequence in which at least one frame has been identified as a key frame. It receives 3D stereo data for each key frame typically in the form of depth maps. The depth maps may be due to any process, such as, but not limited to, human specification, the output of the first phase described above, depth determined from stereo images or direct acquisition of depth using range finding systems. Alternatively, the 3D stereo information may be in some form other than depth maps, for example disparity information obtained from a key frame comprising a stereo pair.

For all other frames in the 2D-image sequence, the invention provides specification of the depth maps, based on the key frame information initially available. It is expected that the number of key frames will be a small fraction of the total number of frames. Hence the invention provides a way of vastly reducing the amount of depth maps required to be initially generated.

Create Mapping Function

Once the system is provided with the key-frames and their corresponding depth maps, the system analyses the key-frames and the corresponding depth map initially available, in order to create a mapping function. The mapping function may be a process or function which takes as input any given measurement of a 2D image, and provides as output a depth map for that image. This mapping is learnt by capturing the relationship between the key-frame image data and depth map data available for those images.

The mapping function may take the form of any generic-processing unit, where input data is received, processed, and an output given. Preferably, this processing unit is amenable to a learning process, where its nature is determined by examination of the key-frame data, and its corresponding depth map. In the field of machine learning, such mapping functions are known and include, although are not limited to, neural networks, decision trees, decision graphs, model trees and nearest-neighbour classifiers.

The system attempts to learn relationships between the input data and desired output data. In a learning process, information from the 2D key-frame image is presented to the training algorithm. This information may be presented on a pixel by pixel basis, where pixel measurements are provided, such as red, green and blue values, or other measurements such as luminance, chrominance, contrast and spatial measurements such as horizontal and vertical positioning in the image. Alternatively, the information may be presented in the form of higher level image features, such as larger sets of pixels and measurements on a set of pixels such as mean and variance or edges, corners etc (i.e. the response of a feature detector). Larger sets of pixels may for example represent segments in the image, being sets of connected pixels forming a homogenous region.

For illustrative purposes only, the 2D image may be represented in the form x,y,R,G,B where x and y represent the x and y coordinates of each pixel and R,G,B represent the red, green and blue value of that pixel.

Next, the corresponding depth map is presented to the training algorithm, so that it may learn its required mapping. Normally individual pixels are presented to the training algorithm However, if higher level image features are being used, such as larger sets of pixels, or segments, the depth map may be a measurement of the depth for that set of pixels, such as mean and variance.

For illustrative purposes only, the depth map may be represented in the form z,x,y where x and y represent the x and y coordinates of each pixel and z represents the depth value assigned to that corresponding pixel.

The process of learning this relationship between input data, and desired output would be understood by those who have worked in the area of artificial intelligence, and may take on many forms. Preferred embodiments of a learning algorithm, are those that seek to design a mapping function which minimises some measurement of mapping error.

The learning algorithm attempts to generalise the relationships between the 2D-image information and the depth map present in the key-frame examples, This generalisation will then be applied to complete the depth maps for the entire sequence. Examples of successful learning algorithms known in the art are the back-propagation algorithm for learning neural networks, the C4.5 algorithm for learning decision trees, and the K-Means algorithm for learning cluster-type classifiers.

For illustrative purposes only, the learning algorithm may be considered to compute the following relationship for each pixel in the 2D image $$z_n = k_a \cdot x_n + k_b \cdot y_n + k_c \cdot R_n + k_d \cdot G_n + k_e \cdot B_n$$

where n is the nth pixel in the key-frame image $z_n$ is the value of the depth assigned to the pixel at $x_n, y_n$ $k_a$ to $k_e$ are constants and are determined by the algorithm $R_n$ is the value of the Red component of the pixel at $x_n, y_n$ $G_n$ is the value of the Green component of the pixel at $x_n, y_n$ $B_n$ is the value of the Blue component of the pixel at $x_n, y_n$ It will be appreciated by those skilled in the art that the above equation is a simplification for purposes of explanation only and would not work in practice. In a practical implementation, using for example a neural network and given the large number of pixels in an image, the network would learn one large equation containing may k values, multiplications and additions.

Figure 3:
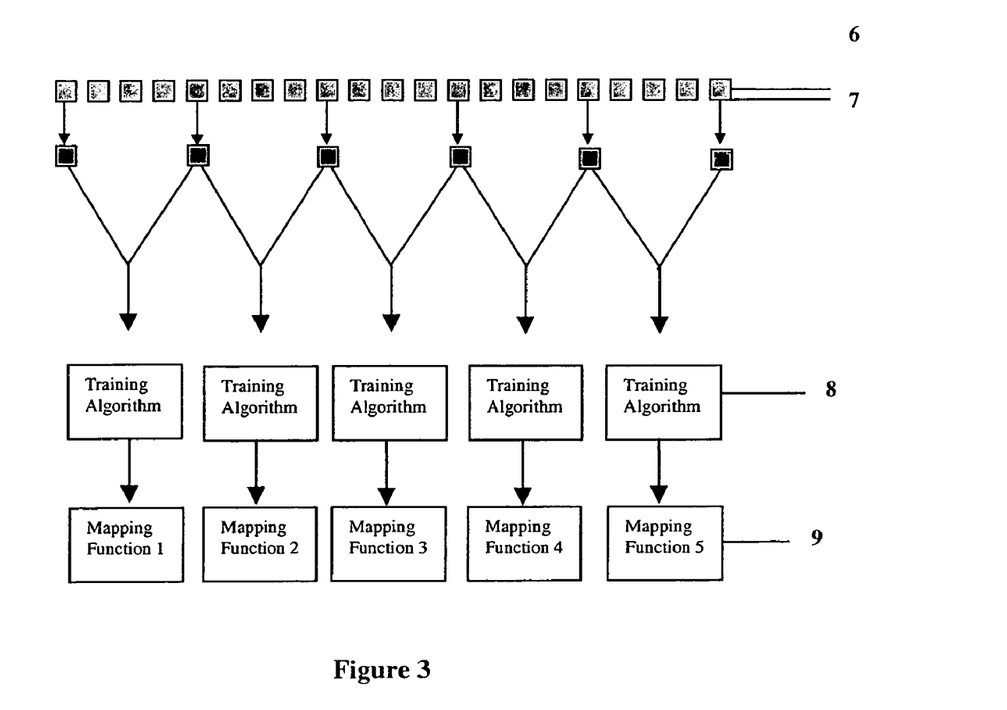
FIG. 3 shows one embodiment of the training process of Phase Two.

This process is illustrated in FIG. 3, which shows a similar process could use a by different number of key frames.

Apply Mapping Function

The invention next takes this mapping function and applies it across a set of 2D images that do not yet have depth maps available. For a given 2D image in that set, the inputs to the mapping function are determined in a similar manner as that presented to the mapping function during the learning process. For example, if the mapping function was learnt by presenting the measurements of a single pixel as input, the mapping function will now require these same measurements for the pixels in the new image. With these inputs, the mapping function performs its learnt task and outputs a depth measurement. Again, in the example for a single pixel, this depth measurement may be a simple depth value. In this example, the mapping function is applied across the entire image sequence, to complete a full set of depth data for the image sequence. Alternatively, if the mapping function was trained using larger sets of pixels, it is now required to generate such larger sets of pixels for the new image. The higher-level measurements on these sets of pixels are made, such as mean and variance, in the same manner as that during the learning process. With these inputs now established, the mapping function produces the required depth measurement, for that set of pixels.

For a sequence of 2D images, key-frames with depth maps may be spaced throughout the sequence, in any arbitrary way. In the preferred embodiment, the mapping function will be presented with a set of key-frames, and their corresponding depth maps, which span a set of 2D images that have some commonality. In the simplest case, two key-frames are used to train the mapping function, and the mapping function is then used to determine the depth maps for the 2D images between the two said key-frames. However, there is no restriction to the number of key-frames that may be used to train a mapping function. Further, there is no restriction to the number of mapping functions that are used to complete a full set of 2D images. In the preferred embodiment two key frames, separated by one or more intervening frames, are defined as inputs to this second phase of processing. The aim of this phase is to assign a depth map to each of these intervening frames. The preferred order in which the intervening frames are assigned depth maps is by processing frames closest in time to the key frames first. Frames that have been processed then become key frames to depth map subsequent frames.

The addition of this time variable assists the training function in generalising the information available in the key-frames. In the absence of a time variable, it is possible that the depth information in two key-frames may contradict each other. This might occur when pixels of a similar colour occur in the same spatial region in both key-frames, but belong to different objects. For example, in the first key-frame, a green car may be observed in the centre of the image, with a depth characteristic bringing it to the foreground. In the next key-frame, the car may have moved, revealing behind it a green paddock, whose depth characteristic specifies a middle ground region. The training algorithm is presented with two key-frames, that both have green pixels in the centre of the image, but have different depth characteristics. It will not be possible to resolve this conflict, and the mapping function is not expected to perform well in such a region. With the introduction of a time variable, the algorithm will be able to resolve the conflict by recognising that the green pixels in the centre of the image, are foreground pixels at a time near the first key-frame in the image sequence. As time progresses towards the second key-frame, the training algorithm will become more inclined to recognise green pixels in the centre of the image as the middleground depth of the green paddock.

Figure 6:
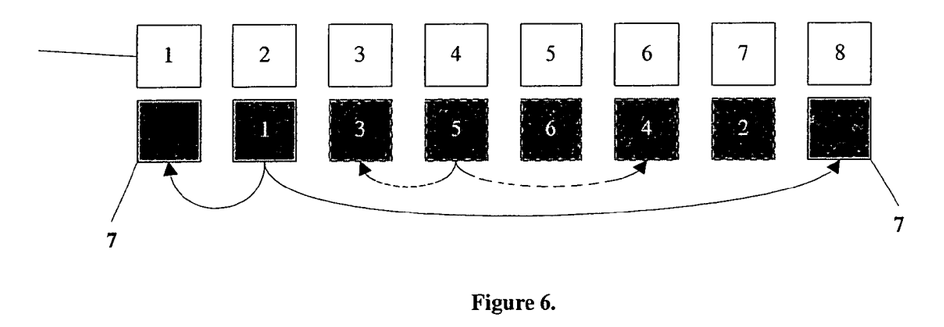
FIG. 6 shows an alternate depth map generation process for Phase two.

This process is illustrated by the example in FIG. 6. The boxes represent individual frames of an image sequence. The top row 6 represents the source frames, which are numbered according to their relative position in the image sequence. The bottom row represents the depth maps generated by this phase. The numbering indicates the order in which depth maps are generated. Although, it will be understood that depth frames 1 and 2 may be processed in reverse order, similarly depth frames 3 and 4 may be reversed etc. The key frames 7 are provided as inputs to the process as described above. The first depth map to be generated is associated with the source frame 1 as indicated. Any subsequent depth map is generated using the previous two depth maps generated.

Preferred Embodiment

Figure 7:
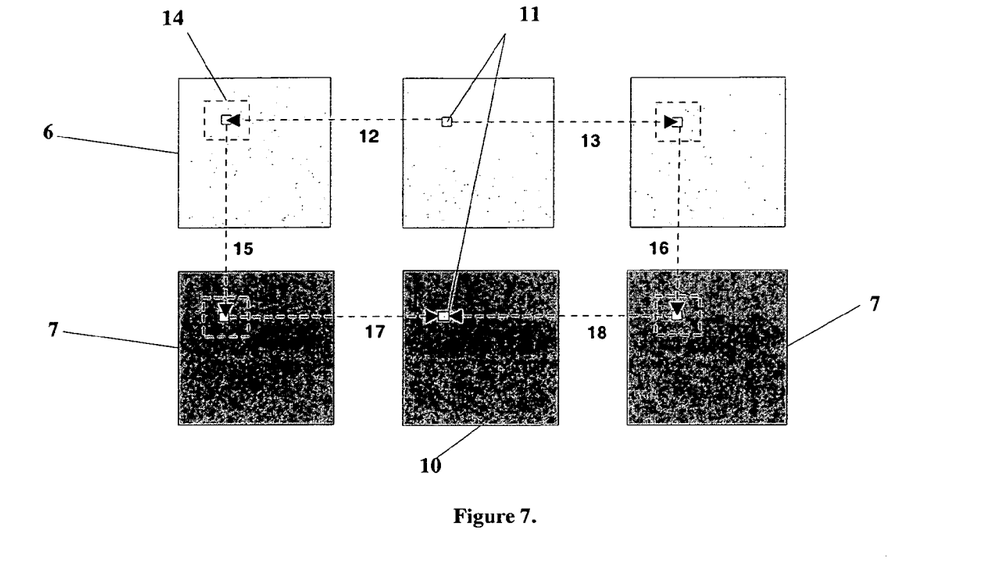
FIG. 7 shows an alternative method to determine depth of an individual pixel in Phase two.

For each pixel in the frame to be depth mapped the image characteristics of the target pixel are used to determine the depth associated with the said pixel. In the preferred embodiment two depth estimates are retrieved, one from each key frame. This process is illustrated in FIG. 7, which shows how a target pixel 11 is compared to the closest source key frame 6 before and after the current frame in the image sequence (step 12 and 13). The learning process, similar to that described previously uses a search radius 14 to identify pixels with similar image characteristics and uses the depth associated with the said pixels (step 15 and 16) to calculate a depth for the target pixel (step 17 and 18). Each key frame generates an estimate of the target pixel's depth, which we will define as D1 and D2.

To determine a final depth associated with the target pixel the depths D1 and D2 must be combined. In the preferred embodiment a weighted average of these values is calculated using the position of the key frames as the weighting parameter. If the distance from the current frame to the first key frame is T1 and the distance to the second key frame is T2 then the depth of the target pixel is given as:

$$w1 = \frac{1}{T1^2}$$
$$w2 = \frac{1}{T2^2}$$
$$depth = \frac{w1}{(w1+w2)} * D1 + \frac{w2}{(w1+w2)} * D2$$

Where D1 and D2 are the depth calculated from key frame 1 and key frame 2, respectively.

In some cases, the learning process cannot determine a depth value for a given pixel. If during the above calculation process one of the two key frame depth estimates could not be determined then the target pixel is assigned to the key frame depth estimate that is assigned and no weighting is used. If neither of the two estimates D1, D2 are defined then the search radius is expanded and the process is repeated.

It should be noted that only one key frame is necessary to generate depth maps for any other frame. However, in situations where the depth of objects change in an image sequence two or more key frames weighted as described above will provide improved results.

It should be appreciated that the order in which frames are processed and the manner in which results from multiple key frames are combined may be varied without substantially affecting the nature of the invention.

As in the case of a 2D image, it will be appreciated that the training stage may be implied by instance based learning in order to determine a depth estimate at any pixel of an image in the sequence.

Figure 4:
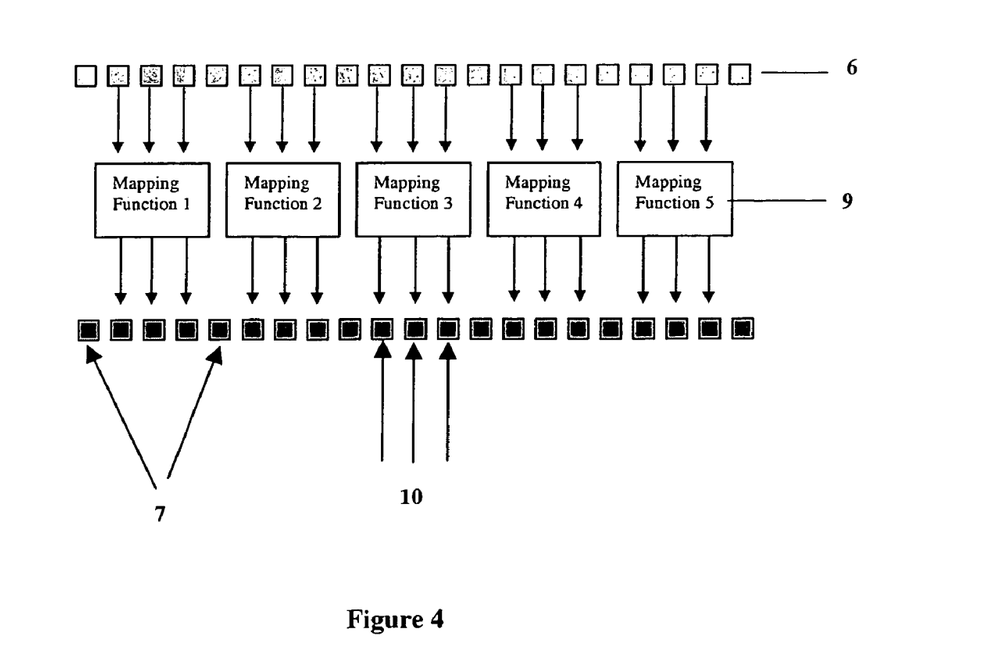
FIG. 4 shows one embodiment of the conversion process of Phase Two.

This process is illustrated in FIG. 4.

It is noted that a learning process similar to that used for Phase 1 may be implemented in Phase 2. Both processes consider the relationship between the input data and desired output, namely the depth. The major difference being that the learning process for Phase 2 should consider a time element depending on the frame number, whereas Phase 1 need not be concerned with a time element.

Other Applications

The mapping functions give a full representation of the depth information for all non key-frame images in the sequence. This may be exploited as an encoding of this depth information. It is expected that the mapping function may be transmitted with a relatively small amount of data, and hence represents a significant compression of the depth information.

Consider the case where there are two key-frames, 20 frames apart in the sequence. A mapping function has been learnt for these two key-frames, and this mapping function now provides all depth information for the intermediate frames. The mapping function itself represents a compression of all this depth information across the twenty frames. If, for example purposes only, the mapping function can be written to a file using 6000 bytes, then for this cost we gain 20 frames worth of depth information. Effectively, this represents a file size of 6000/20=300 bytes per frame. In a practical implementation the effective compression will be substantial.

In a further application, this above compression may allow for efficient transmission of 3D information, embedded in a 2D-image source i.e, a 2D compatible 3D image. Since the mapping functions require a file length that is typically a tiny fraction of the 2D image data that it provides 3D information for, the addition of 3D information to the 2D-image sequence is achieved with a very small overhead.

In this case, the 3D information is generated prior to viewing, or in real-time, at the viewing end, by simply applying the mapping function over each 2D image in the sequence as it is viewed. This is made possible by the fact that the types of mapping functions found in machine learning are very efficient in providing calculations after they have been trained. Typically the training process is slow and resource intensive, and is usually performed offline during the process of building the 3D image content. Once trained, the mapping function may be transmitted to the viewer end and will perform with a very high throughput suitable for real-time conversion of the 2D image to 3D.

The Applicant's own previous disclosures have related to techniques for converting 2D images into stereoscopic 3D images. The conversion processes disclosed incorporated the generation of a depth map that was associated with a 2D image. In one embodiment the depth maps were created manually on a frame by frame basis. The improvement described in this application enables a fewer number of key-frames to have depth maps created and the intermediate depth maps calculated. Since the key-frames represent a small fraction of the total number of frames, this new technique represents a substantial improvement in conversion efficiency both in terms of time and cost.

It is a specific intent of this disclosure that the invention should be applied to the creation of depth maps for other than the production of stereoscopic images.

It will be known to those skilled in the art that depth maps are used extensively within the special effects industry in a process called rotoscoping. In order to composite live action, or computer generated images, within a 2D image it is frequently necessary to manually produce a depth map, or matte for each frame of 2D image. These mattes enable the additional images to be composed so as to appear to move with the appropriate geometry within the original 2D image. The invention described above enables the rapid generation of such mattes.

It is also known that cameras are being developed that enable a depth map to be obtained from a live scene. Typically these use laser range finding techniques and are generically known as LIDAR devices. In order to capture depth maps at television frame rates an expensive and complex system is required. The application of this invention would enable simpler and less complex LIDAR devices to be constructed that need only capture depth maps at a fraction of the video field rate, or other infrequent periods, and the missing depth maps produced by interpolation using the techniques described in this invention.

What is claimed is:

1. A method of creating a depth map including the steps of:
    assigning a depth to at least one pixel or portion of an image;
    determining relative location and image characteristics for each said at least one pixel or portion of said image;
    utilising said depth(s), image characteristics and respective relative location to determine a configuration of a first algorithm to ascertain depth characteristics as a function of relative location and image characteristics;
    utilising said first algorithm to calculate a depth characteristic for each pixel or portion of said image;
    wherein said depth characteristics form a depth map for said image.

2. A method as claimed in claim 1, wherein said image characteristics include RGB values.

3. A method as claimed in claim 1 further including the step of reassigning a depth to any pixel or portion of said image to correct for any inconsistencies.

4. A method as claimed in claim 1, wherein said image characteristics include at least one of luminance, chrominance, contrast or spatial measurements.

5. A method as claimed in claim 1, wherein said first algorithm may be represented by the equation:

$$z=f(x,y,R,G,B)$$

where x and y define the relative location of a sample.

6. A method as claimed in claim 1, wherein a learning algorithm is utilised to determine the configuration of said first algorithm.

7. A method as claimed in claim 6, wherein for each pixel in the image, the learning algorithm computes:

$$z_n = k_a \cdot x_n + k_b \cdot y_n + k_c \cdot R_n + k_d \cdot G_n + k_e \cdot B_n$$

where
n is the nth pixel in the key-frame image
$z_n$ is the value of the depth assigned to the pixel at $x_n, y_n$
$k_a$ to $k_e$ are constants and are determined by the algorithm
$R_n$ is the value of the Red component of the pixel at $x_n, y_n$
$G_n$ is the value of the Green component of the pixel at $x_n, y_n$
$B_n$ is the value of the Blue component of the pixel at $x_n, y_n$.

8. A method as claimed in claim 6, wherein a random component is introduced to the learning algorithm to reduce over-training.

9. A method as claimed in claim 8, wherein said random component is a small positive or negative random number.

10. A method as claimed in claim 7, wherein said learning algorithm initially identifies pixels having similar characteristics to a known pixel.

11. A method as claimed in claim 10, wherein similar pixels are searched for within a search radius.

12. A method as claimed in claim 11, wherein said search radius varies for each characteristic.

13. A method as claimed claim 11, wherein the depth of a pixel is determined by a weighted average of distances from similar pixels.

14. A method as claimed in claim 13, wherein weights are inversely proportioned to distance.

15. A method as claimed in claim 6, wherein each characteristic is divided or partitioned into a set of regions and a depth value assigned based on the region which is occupied.

16. A method of creating a depth map including the steps of:
    assigning a depth to at least one pixel or portion of an image;
    determining x,y coordinates and image characteristics for each said at least one pixel or portion of said image;
    utilising said depth(s), image characteristics and respective x,y coordinates to determine a first algorithm to ascertain depth characteristics as a function of x,y coordinates and image characteristics;
    utilising said first algorithm to calculate a depth characteristic for each pixel or portion of said image;
    wherein said depth characteristics form a depth map for said image.

17. A method as claimed in claim 16, wherein said image characteristics include RGB values.

18. A method as claimed in claim 16 further including the step of reassigning a depth to any pixel or portion of said image to correct for any inconsistencies.

19. A method as claimed in claim 16, wherein said image characteristics include at least one of luminance, chrominance, contrast or spatial measurements.

20. A method as claimed in claim 16, wherein said first algorithm may be represented by the equation:

$$z=f(x,y,R,G,B)$$

where x and y define the relative location of a sample.

21. A method as claimed in claim 16, wherein a learning algorithm is utilised to determine the configuration of said first algorithm.

22. A method as claimed in claim 21, wherein for each pixel in the image, the learning algorithm computes:

$$z_n = k_a \cdot x_n + k_b \cdot y_n + k_c \cdot R_n + k_d \cdot G_n + k_e \cdot B_n$$

where
n is the nth pixel in the key-frame image
$z_n$ is the value of the depth assigned to the pixel at $x_n, y_n$
$k_a$ to $k_e$ are constants and are determined by the algorithm
$R_n$ is the value of the Red component of the pixel at $x_n, y_n$
$G_n$ is the value of the Green component of the pixel at $x_n, y_n$
$B_n$ is the value of the Blue component of the pixel at $x_n, y_n$.

23. A method as claimed in claim 21, wherein a random component is introduced to the learning algorithm to reduce over-training.

24. A method as claimed in claim 23, wherein said random component is a small positive or negative random number.

25. A method as claimed in claim 21, wherein said learning algorithm initially identifies pixels having similar characteristics to a known pixel.

26. A method as claimed in claim 25, wherein similar pixels are searched for within a search radius.

27. A method as claimed in claim 26, wherein said search radius varies for each characteristic.

28. A method as claimed in of claim 25, wherein the depth of a pixel is determined by a weighted average of distances from similar pixels.

29. A method as claimed in claim 28, wherein weights are inversely proportioned to distance.

30. A method as claimed in claim 21, wherein each characteristic is divided or partitioned into a set of regions and a depth value assigned based on the region which is occupied.

31. A method of creating a series of depth maps for an image sequence including the steps of:
   selecting at least one key frame from said image sequence;
   for each at least one key frame assigning a depth to at least one pixel or portion of each frame;
   determining relative location and image characteristics for each said at least one pixel or portion of each said key frame;
   utilising said depth(s), image characteristics and respective relative location for each said at least one key frame to determine a first configuration of a first algorithm for each said at least one frame to ascertain depth characteristics as a function of relative location and depth characteristics;
   utilising said first algorithm to calculate depth characteristics for each pixel or portion of each said at least one key frame;
   wherein said depth characteristics form a depth map for each said at least one key frame;
   utilising each depth map to determine a second configuration of a second algorithm to ascertain the depth characteristics for each frame as a function of relative location and image characteristics;
   utilising said second algorithm to create respective depth maps for each frame of said image sequence.

32. A method as claimed in claim 31, wherein frames adjacent said key frames are processed prior to non-adjacent frames.

33. A method as claimed in claim 32, wherein following processing adjacent frames are considered as key frames for further processing.

34. A method of creating a series of depth maps for an image sequence including the steps of:
   receiving a depth map for at least one frame of said image sequence;
   utilizing said at least one depth map to determine a second configuration of a second algorithm to ascertain the depth characteristics as a function of relative location and image characteristics;
utilizing said algorithm to create a depth map for each frame of said image sequence;
   wherein a learning algorithm is utilized to determine the configuration of said second algorithm; and
   wherein said second algorithm computes:

$$z_n = k_a \cdot x_n + k_b \cdot y_n + k_c \cdot R_n + k_d \cdot G_n + k_e \cdot B_n$$

where
n is the nth pixel in the key-frame image $z_n$ is the value of the depth assigned to the pixel at $x_n, y_n$
$k_a$ to $k_e$ are constants and are determined by the algorithm
$R_n$ is the value of the Red component of the pixel at $x_n, y_n$
$G_n$ is the value of the Green component of the pixel at $x_n, y_n$
$B_n$ is the value of the Blue component of the pixel at $x_n, y_n$.

35. A method of creating a series of depth maps for an image sequence including the steps of:
   receiving a depth map for at least one frame of said image sequence;
   utilizing said at least one depth map to determine a second algorithm to ascertain the depth characteristics as a function of x,y coordinates and image characteristics;
   utilizing said algorithm to create a depth map for each frame of said image sequence;
   wherein a learning algorithm is utilized to determine the configuration of said second algorithm; and
   wherein said second algorithm computes:

$$z_n = k_a \cdot x_n + k_b \cdot y_n + k_c \cdot R_n + k_d \cdot G_n + k_e \cdot B_n$$

where
n is the nth pixel in the key-frame image
$z_n$ is the value of the depth assigned to the pixel at $x_n, Y_n$
$k_a$ to $k_e$ are constants and are determined by the algorithm
$R_n$ is the value of the Red component of the pixel at $x_n, y_n$
$G_n$ is the value of the Green component of the pixel at $x_n, y_n$
$B_n$ is the value of the Blue component of the pixel at $x_n, y_n$.

36. A method of creating a series of depth maps for an image sequence including the steps of:
   receiving a depth map for at least one frame of said image sequence;
   utilizing said at least one depth map to determine a second configuration of a second algorithm to ascertain the depth characteristics as a function of relative location and image characteristics;
utilizing said algorithm to create a depth map for each frame of said image sequence;
   wherein a learning algorithm is utilized to determine the configuration of said second algorithm; and
   wherein said second algorithm computes:

$$z_n = k_a \cdot x_n + k_b \cdot y_n + k_c \cdot R_n + k_d \cdot G_n + k_e \cdot B_n + k_f \cdot T$$

where:
n is the nth pixel in the key-frame image
$z_n$ is the value of the depth assigned to the pixel at $x_n, y_n$
$k_a$ to $k_f$ are constants and are determined by the algorithm
$R_n$ is the value of the Red component of the pixel at $x_n, y_n$
$G_n$ is the value of the Green component of the pixel at $x_n, y_n$
$B_n$ is the value of the Blue component of the pixel at $x_n, y_n$
T is a measurement of time, for this particular frame in the sequence.

37. A method of encoding a series of frames including transmitting at least one mapping function together with said frames, wherein said mapping function includes an algorithm to ascertain depth characteristics as a function of relative location and image characteristics;
   wherein a learning algorithm is utilized to determine said mapping function; and
   wherein said mapping function computes:

$$z_n = k_a \cdot x_n + k_b \cdot y_n + k_c \cdot R_n + k_d \cdot G_n + k_e \cdot B_n$$

where
n is the nth pixel in the key-frame image
$z_n$ is the value of the depth assigned to the pixel at $x_n, Y_n$
$k_a$ to $k_e$ are constants and are determined by the algorithm $R_n$ is the value of the Red component of the pixel at $x_n,y_n$
$G_n$ is the value of the Green component of the pixel at $x_n,y_n$
$B_n$ is the value of the Blue component of the pixel at $x_n,y_n$.

38. A method of creating a series of depth maps for an image sequence including the steps of:
   receiving a depth map for at least one frame of said image sequence;
   utilizing said at least one depth map to determine a second algorithm to ascertain the depth characteristics as a function of x,y coordinates and image characteristics;
   utilizing said algorithm to create a depth map for each frame of said image sequence;
   wherein a learning algorithm is utilized to determine the configuration of said second algorithm; and
   wherein said second algorithm computes:

$$z_n = k_a \cdot x_n + k_b \cdot y_n + k_c \cdot R_n + k_d \cdot G_n + k_e \cdot B_n + k_f T$$

where:
n is the nth pixel in the key-frame image
$z_n$ is the value of the depth assigned to the pixel at $x_n,y_n$
$k_a$ to $k_f$ are constants and are determined by the algorithm
$R_n$ is the value of the Red component of the pixel at $x_n,y_n$
$G_n$ is the value of the Green component of the pixel at $x_n,y_n$
$B_n$ is the value of the Blue component of the pixel at $x_n,y_n$
T is a measurement of time, for this particular frame in the sequence.

39. A method of creating a series of depth maps for an image sequence including the steps of:
   receiving a depth map for at least one frame of said image sequence;
   utilizing said at least one depth map to determine a second algorithm to ascertain the depth characteristics as a function of x,y coordinates and image characteristics;
   utilizing said algorithm to create a depth map for each frame of said image sequence, wherein frames adjacent said key frames are processed prior to non-adjacent frames;
   wherein said second algorithm computes:

$$z_n = k_a \cdot x_n + k_b \cdot y_n + k_c \cdot R_n + k_d \cdot G_n + k_e \cdot B_n + k_f T$$

where:
n is the nth pixel in the key-frame image
$z_n$ is the value of the depth assigned to the pixel at $x_n,y_n$
$k_a$ to $k_f$ are constants and are determined by the algorithm
$R_n$ is the value of the Red component of the pixel at $x_n,y_n$
$G_n$ is the value of the Green component of the pixel at $x_n,y_n$
$B_n$ is the value of the Blue component of the pixel at $x_n,y_n$
T is a measurement of time, for this particular frame in the sequence.

* * * * *

UNITED STATES PATENT AND TRADEMARK OFFICE
CERTIFICATE OF CORRECTION

| | |
|---|---|
| PATENT NO. | : 7,035,451 B2 |
| APPLICATION NO. | : 09/925932 |
| DATED | : April 25, 2006 |
| INVENTOR(S) | : Philip Victor Harman et al. |

It is certified that error appears in the above-identified patent and that said Letters Patent is hereby corrected as shown below:

In Column 20, Claim 39, Line 3:
　　Please replace "a depth map" with --depth maps-- and replace "one frame" with --two key frames--

In Column 20, Claim 39, Line 5:
　　Please replace "at least one depth map" with --depth maps--

Signed and Sealed this

Nineteenth Day of September, 2006

JON W. DUDAS
*Director of the United States Patent and Trademark Office*